INVENTOR.
Rudolph F. Onsrud
BY Pendleton, Neuman,
Seibold & Williams
Attorneys

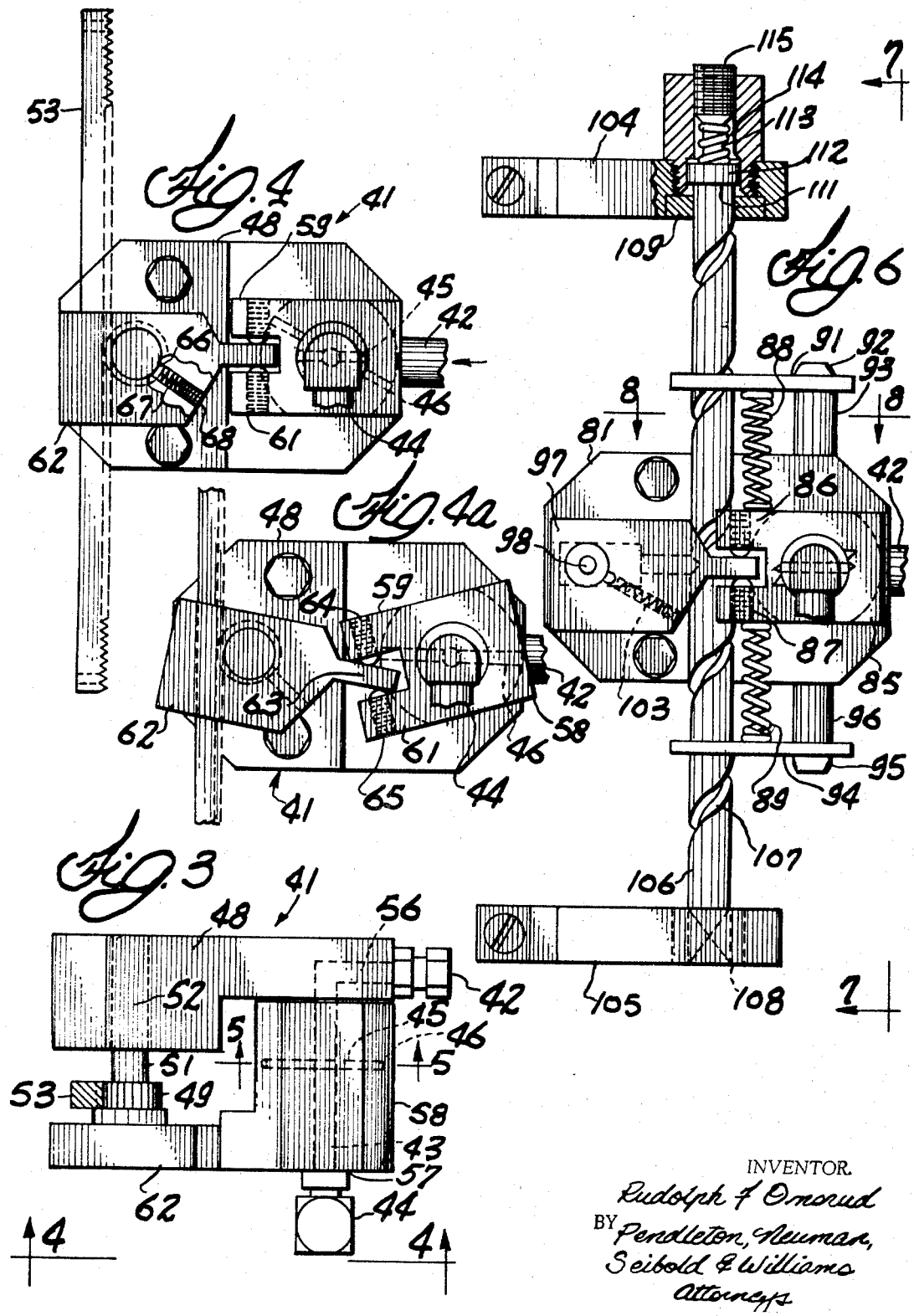

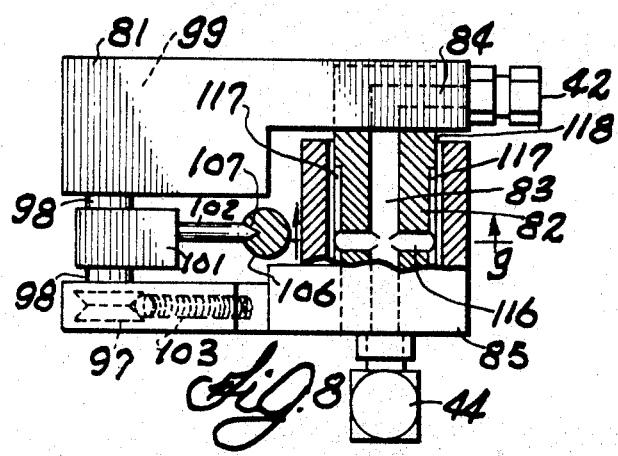
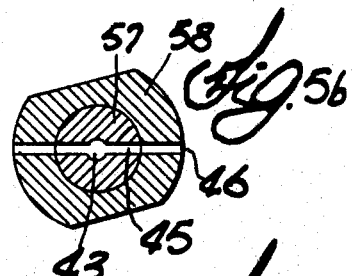
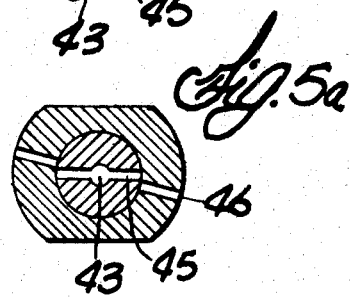
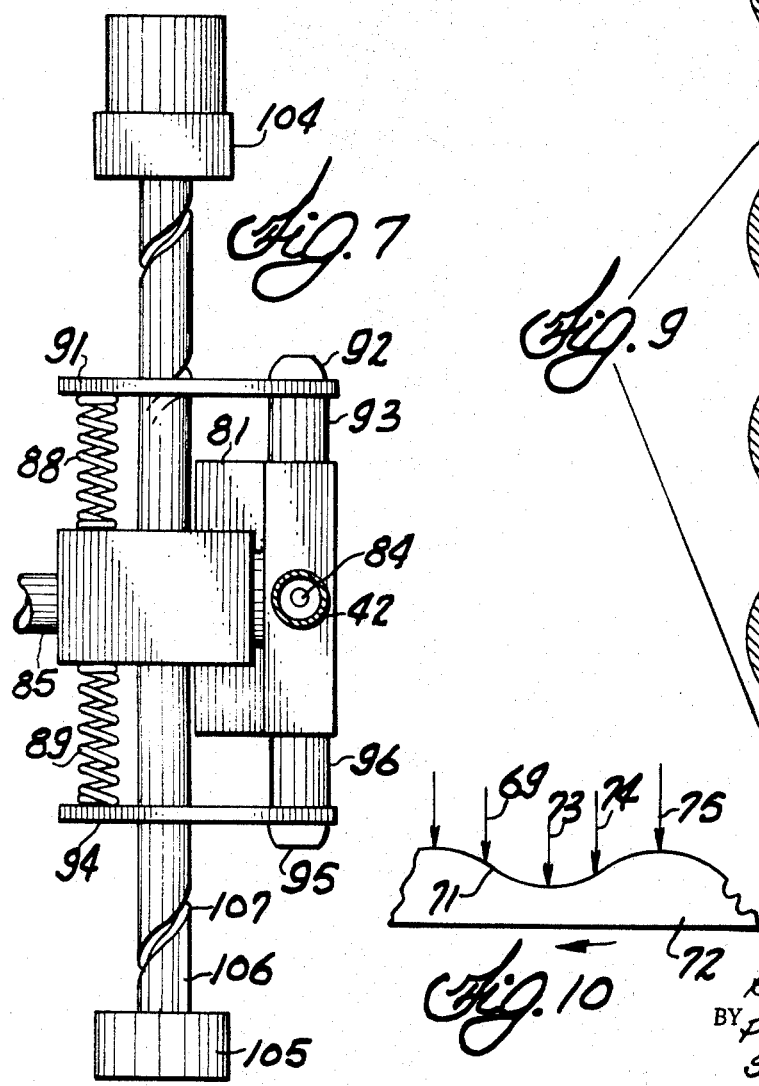
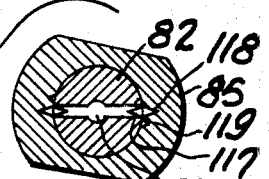
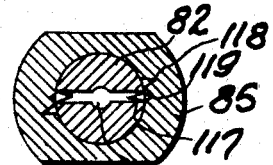
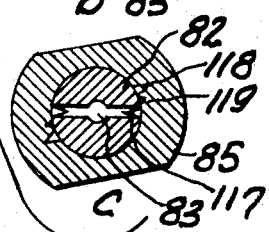

United States Patent Office 3,404,601
Patented Oct. 8, 1968

3,404,601
PRESSURE REGULATOR FOR CONTROLLING THE DOWNWARD FORCE ON THE HEAD OF A ROUTER OR THE LIKE
Rudolph F. Onsrud, Glenview, Ill., assignor to Onsrud Machine Works, Inc., a corporation of Illinois
Filed Jan. 3, 1966, Ser. No. 518,441
7 Claims. (Cl. 90—14)

ABSTRACT OF THE DISCLOSURE

An air pressure valve or regulator for power assist mechanisms, as for example routers, whereby in one direction of operation a higher pressure is available and in another direction of operation a lesser pressure is available.

This invention relates to a fluid pressure regulating system and apparatus for controlling the fluid pressure to power assist mechanisms, more particularly to such a regulating system and apparatus functioning in connection with the force supplying the downward pressure to the head of a hand-operated router or the like, and it is an object of the invention to provide improved apparatus of this character.

Ordinarily, routers or the like utilize a cutting tool rotating around a vertical axis for cutting a groove in, or shaping the edge of, a piece of work. The downward force necessary to keep the cutting tool in contact with the workpiece is achieved by the weight preponderance of the head and its associated mechanism over that of an appropriate counterweight disposed within the framework of the machine. By virtue of such weight preponderance the router cutting tool is held downward against the workpiece with positive force at all times and must be lifted upwardly from the workpiece when the cutting tool is to be removed therefrom. In some router cutting applications, the router head must move upwardly and downwardly as well as on a level. In downward movements, which may be referred to as downhill cuts, full force is desirable in making certain that the cutting tool remains properly in contact with the workpiece. On the other hand, when the cutting tool is moving upwardly, which may be referred to as uphill cuts, decreased downward force against the cutting head is desirable in order to decrease somewhat the force necessary to move the workpiece past the cutting tool. On level cuts, that is, between downhill and uphill cuts, an intermediate force is desirable.

In most ordinary router applications, the router head moves up and down to accommodate undulations in the workpiece. The up and down movements are occasioned by the operator moving the workpiece transversely underneath the router head. The router head has a foot or the like in contact with the workpiece and, thus, moves upwardly when the workpiece is pushed against the foot and moves downwardly when the workpiece is pushed away from the foot. In the latter case the force of gravity lowers the head. The weight preponderance of the router head, while perhaps 20% of the weight, represents a substantial force to be overcome for uphill cuts, and may require a substantial effort particularly where the surface of the material being worked on exhibits a substantial amount of friction.

The described disadvantages are overcome, according to the invention, by providing a fluid pressure regulating system (air pressure, for example) in connection with a fluid pressure operating mechanism such that when uphill cuts are begun from a level position of the head the downward force of the head is lessened and when downhill cuts are begun the downward force of the head is increased. In this manner, the exertion necessary by the operator is lessened on uphill cuts and the cutting tool is held more firmly in contact with the workpiece on downhill cuts, and it is a further object of the invention to provide improved fluid pressure regulating apparatus of the nature and for the purpose indicated.

It is a further object of the invention to provide improved fluid pressure regulating apparatus of the character indicated for maintaining a desired downward force on the cutting head of router apparatus.

It is a further object of the invention to provide improved fluid pressure regulating apparatus of the character indicated for maintaining a larger force on a router cutting head for downhill cuts and a lesser force for uphill cuts.

It is a further object of the invention to provide improved fluid pressure regulating apparatus of the character indicated for maintaining a larger force on a router cutting head for downhill cuts and a lesser force for cuts along the level.

It is a further object of the invention to provide improved fluid pressure regulating apparatus of the character indicated for maintaining an intermediate force on a router cutting head for level cuts and a larger force for downhill cuts.

Further objects and advantages of the invention will become apparent as the description proceeds.

According to one form of the invention there is provided in router apparatus including a frame, a router head adapted to move up and down on said frame in following the profile of a workpiece, fluid pressure actuated means attached to said frame and said head for assisting such up and down movements, and a source of fluid pressure for said actuating means, the combination comprising: means for bypassing a portion of said fluid pressure, and means responsive to up and down movements of said router head for controlling said bypass means.

According to another form of the invention there is provided in router apparatus including a frame, a router head adapted to move up and down on said frame in following the profile of a workpiece, fluid pressure actuated means attached to said frame and said head for assisting such up and down movements, and a source of fluid pressure for said actuating means, the combination comprising: means attached to said head for up and down movement therewith, valve means for bypassing a portion of said fluid pressure mounted on said frame, and valve actuating means controlled by said means attached to said head for controlling said valve means in response to said up and down movements.

For a more complete understanding of the invention reference should be had to the accompanying drawings in which:

FIG. 3 is a fragmentary view partially in section, on a larger scale, taken substantially in the direction of the arrows 3–3 of FIG. 1;

FIG. 4 is a fragmentary view taken substantially in the direction of the arrows 4—4 of FIG. 3 showing one operative position of certain components;

FIG. 4a is a view similar to FIG. 4 showing the components of FIG. 4 in a further operating position;

FIG. 5a is a sectional view taken substantially in the direction of the arrows 5—5 showing the position of the operating components as depicted in FIG. 4;

FIG. 5b is a sectional view similar to FIG. 5a showing the position of the operating components as depicted in FIG. 4a;

FIG. 6 is a fragmentary view similar to FIG. 4 illustrating a further embodiment of the invention;

FIG. 7 is a view taken substantially in the direction of the arrows 7—7 of FIG. 6;

FIG. 8 is a view partially in section taken substantially in the direction of the arrows 8—8 of FIG. 7;

FIG. 9a is a sectional view taken substantially in the direction of the arrows 9—9 of FIG. 8 showing certain components in one operative position;

FIG. 9b is a sectional view similar to FIG. 9a showing the components in a further operative position;

FIG. 9c is a sectional view similar to FIGS. 9a and 9b showing the components in a still further operative position; and FIG. 10 is a diagrammatic view illustrating various positions of the operating head of a router in a typical routine of work.

Figure 1:
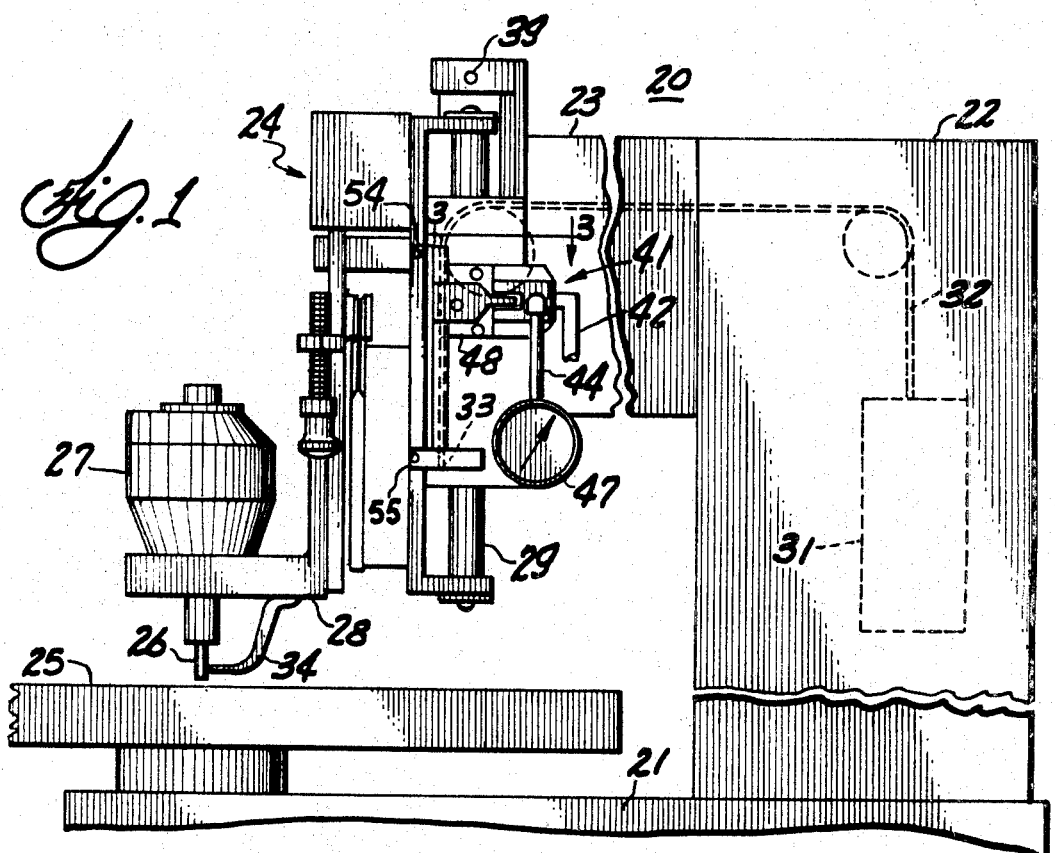
FIGURE 1 is a side view of router apparatus embodying fluid pressure regulating apparatus according to the invention.

Referring to the drawings, the invention is shown, for example, in a router 20 comprising a base 21, a vertical member or pedestal 22, a horizontal arm 23, a head 24 slidably mounted on the horizontal arm 23, and a worktable 25 supported on base 21.

The head 24 includes a vertical axis cutting tool 26 adapted to be driven by any suitable motor 27 which may be hydraulic, electric, air or otherwise. The motor is supported on a framework 28 which includes vertical guides 29 adapted to move vertically in suitable slides (not shown) provided in the front end of the horizontal arm 23. A counterweight 31 is attached by means of a flexible cable or the like 32 to an abutment 33 on the head 24, the cable passing over suitably disposed guide pulleys.

The weight of the head 24 including framework 28, motor 27, guides 29, etc., is such as to have a preponderance of weight over that of counterweight 31. For example, the head and its connected components might be 20 percent heavier than the counterweight. In this manner, the cutting tool 26 will always be caused to remain in contact with any work disposed on table 25. A foot or the like 34 may be attached to frame 28 and have its lower end disposed in the vicinity of cutting tool 26 for determining the cutting depth. Upward force exerted against the head when uphill cuts are to be made are exerted against the lower end of foot 34.

Attached to the front end of the horizontal arm 23 is an air cylinder 35 within which there is disposed a suitable piston 36 attached to a connecting rod 37 which is in turn attached to an abutment 38 forming part of the head 24. Air pressure is supplied to the upper end of cylinder 35 by way of pipe 39 through air pressure regulating mechanism 41 from a source of air pressure represented by pipe 42, air pressure being continuously exerted against the upper end of piston 36. While air pressure is a preferred form, other fluid pressures may be used. The head including the cutting tool 26 and its drive motor 27 are continuously urged downwardly against the workpiece and against the counterbalancing force exerted by the weight 31. Because the fluid pressure is always present, the weight preponderance of a router head over that of the counterweight may be reduced over the ordinary device.

Figure 2:
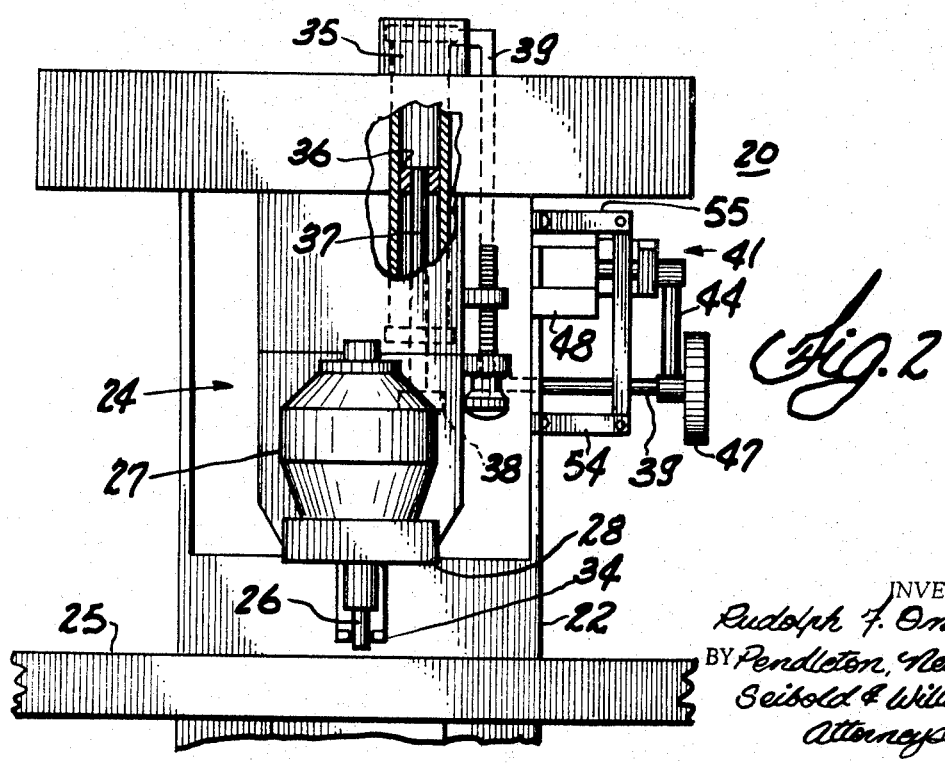
FIG. 2 is a front view of the apparatus shown in FIG. 1.

The regulating mechanism 41, as disclosed, is essentially an air bypass arrangement controlled by the upward and downward movements of the head 24. Thus, air pressure may be supplied through pipe 42, passageway 43, and pipe 44 to pipe 39 (shown with the reference character applied twice for clarity, in FIG. 2). Under this condition, the full pressure available which, for example, may be about 17 lbs. per square inch, is exerted against the upper end of piston 36. To relieve the pressure in cylinder 35 a bypass consisting of two passageways 45 and 46 (FIG. 5b) is provided thereby allowing a portion of the air pressure to be bled off leaving, for example, 4 lbs. per square inch typically in the cylinder 35. A gauge 47 may be connected to the juncture of pipes 44 and 39, for example, to indicate the pressure existing inside of cylinder 35.

Referring to FIGS. 3, 4, 5a and 5b, further structure and the operation of the regulating mechanism or bypass valve may be more fully explained.

A supporting member or block 48 is attached to the forward end of horizontal arm 23 by any suitable bolts, for example, and supports the valve mechanism, as will become clear, including a pinion gear 49 supported on shaft 51 in a bearing 52. A gear rack 53 is attached at its upper and lower ends to the frame 28 by a pair of arms 54 and 55, and engages the pinion gear 49. At one end of block member 48, there is a bore 56 communicating with pipe 42 (air supply) suitably supported in fixed position. At the same end of member 48 is a stationary valve member 57 which includes the bore or passageway 43 communicating with bore 56. The pipe 44 through suitable connectors communicates with bore 43.

Surrounding the valve member 57 is a movable valve member 58, the inner bore of which has a slidable but sealable fit with the outer surface of the valve member 57. The valve member 57 is provided with the passageway or bore 45 and the valve member 58 is provided with the passageway or bore 46 which passageways may register with each other to provide a bypass passageway or may be displaced from each other to seal off the passageway, as may be envisioned in FIGS. 5a and 5b. The outer end portion of valve member 58 is bifurcated, as shown, providing two parts 59 and 61 with a slot therebetween. An operating member 62 mounted to rotate on shaft 51 (FIG. 3) includes a front end finger 63 received between bifurcated members 59 and 61, adjusting screws 64 and 65 being received in members 59 and 61. The operating member 62 is coupled to pinion gear 49 by means of a slip clutch or frictional drive including a friction member 66 which may be a steel ball, for example, urged against a grooved wheel on the end of shaft 51 by means of a spring 67 and an adjusting screw 68.

In one condition of operation, for example, when the router head is on a downhill cut, the rack 53 will be in a downward position by virtue of which the pinion gear 49 and the frictional member 66 will have caused the valve operating member 62 to assume the position shown in FIG. 4. In this circumstance, the valve members 57 and 58 occupy the position shown in FIG. 5a, and the passageways 45 and 46 are out of registry, thereby sealing the bleed off passage and permitting full pressure to be applied through the passageway described to the cylinder 35. The cutting tool 26, thus, has the higher downward force exerted on it. A downhill cut may be that illustrated by the arrow 69 (FIG. 10) pointing to a downhill sloping surface 71 schematically as part of a workpiece 72. When the workpiece 72 reaches the position indicated by the arrow 73, the valve members 62 and 58 will tend to remain in the positions shown in FIG. 4, but since the work is being moved along a horizontal pathway, the higher downward pressure is not of substantial significance. When the work is on an uphill cut, as shown by the arrow 74, the rack 53 will have moved upwardly thereby causing the valve member 62 to pivot clockwise. Corespondingly (because of finger 63) the valve member 58 is moved counterclockwise, as shown in FIG. 4a and FIG. 5b. In this circumstance, the passageways 45 and 46 are in communication with each other (FIG. 5b) thereby diverting air from the source as described and, thus, providing a reduced pressure in cylinder 35. The reduced pressure causes a decreased downward force to be exerted on the router head, whereby it is substantially easier for the operator to move the workpiece 72 under the cutting tool. When the workpiece reaches a position of horizontal cut, for example, as represented by the arrow 75, the valve members will retain the positions shown in FIG. 4a maintaining a condition of reduced pressure against the router head. The reduced pressure is of no substantial significance because the workpiece is being moved along a horizontal path.

The amount of friction needed to cause movement of valve operating member 62 may be regulated by changing the compression of spring 67 with adjusting screw 68. Such a frictional or slipping connection is needed in order that continued upward or downward movement of the rack 53 will not break or overstress the parts at their limits of movement.

The embodiment of the invention illustrated in FIGS. 6 through 9, inclusive, enables three values of pressure to be exerted inside of cylinder 35. The cylinder 35, the piston 36, the air supply pipe 42 and some other components to be referred to are the same in this embodiment of the invention as in the embodiment already described.

A supporting member or block 81 is attached to the forward end of horizontal arm 23 by any suitable bolts, for example. A fixed valve member 82 is held in one end of supporting block 81 and includes a bore 83 communicating with a bore 84 in block member 81 and, thus, with air supply pipe 42. The bore 83 communicates with pipe 44 and, thus, through pipe 39 with cylinder 35, as described in connection with the preceding embodiment.

Surrounding the fixed valve member 82 in a close rotating fit is a movable valve member 85 whose outer end includes the bifurcated portions 86 and 87. The valve member 85 may occupy any of three positions, as will be described in connection with FIG. 9, but springs 88 and 89 are provided on the respective sides of the member 85 to hold it in its median position and to return it to this position following displacement. The other end of spring 88 abuts against a finger 91 held to supporting block 81 by means of a screw 92 and spacer 93. Similarly, the other end of spring 89 abuts a finger 94 which is held to the supporting member 81 by means of a screw 95 and spacer 96.

Springs 88 and 89 are selected to be of suitable stiffness in relationship to the other components of the regulator.

The valve operating member 97 is mounted on a shaft 98 which is supported in a suitable bearing 99 in supporting member 81. Firmly attached to shaft 98 is a follower 101 including a pointer 102. The valve operating member 97 is firmly attached to shaft 98 by any suitable means such as, for example, a pin 103.

Supported on the head 24 by means of brackets 104 and 105 is a spirally grooved rod 106, the spiral being designated by the reference character 107. Referring to FIG. 8, it will be seen that the end of pointer 102 is received in the spiral groove 107.

The lower end of spirally grooved rod 106 is received in a suitable bearing 108 and the upper end is supported by a suitable bearing member 109. Abutting the upper end surface 111 of grooved member 106 is the lower end of a friction member 112, which may be of any suitable material, for example, nylon. Friction member 112 may have a nib 113 extending therefrom which is surrounded by a spring 114 held in position by a threaded set screw 115. By adjusting set screw 115 the compression in spring 114 may be selected to bring about any desired amount of friction between the lower surface of friction member 112 and the upper end 111 of spiral groove 106.

Referring to FIG. 8, it will be seen that the fixed valve member 82 is firmly received in a suitable opening in support block 81 and has a bore 83 in communication with bore 84. There is a transverse bore 116 communicating with bore 83 and terminating in longitudinal grooves 117 in each side of the member 82, the grooves 117 being selected to be of particular suitable size, for example. The movable valve member 85 has two sets of two grooves 118 and 119 of different sizes, as shown, cut on the interior surface thereof (FIG. 9). The grooves 118 and 119 terminate at the end of valve member 85 adjacent the end of support block 81 so as to provide an exhaust opening as may be seen best in FIG. 8. The grooves 118 and 119 being of different sizes provide different sizes of bypass openings for relieving the pressure operating in cylinder 35.

The operation of the embodiment shown in FIGS. 6–9 may now be explained. Assuming that the cutting tool of the router is on a horizontal cut, as shown by arrows 73 or 75 of FIG. 10, the valve operating member 97 and the movable valve member 85 will occupy horizontal positions, as shown in FIG. 6 and in FIG. 9b. In this circumstance the groove 17 and the smaller groove 119 are in communication with each other thereby providing a bypass of one size for the air entering through the pipe 42 continuing to the cylinder 35. With a bypass of this magnitude an intermediate pressure of about 10 lbs. per square inch, for example, will exist inside of the cylinder. As the cutter enters an uphill cut, as shown by arrow 74, for example, the spiral member 106 moves upwardly and rotates about its own axis because the pointer 102 is received in groove 107. The friction member 112 slippably resists such rotation which resistance causes member 97 to pivot counterclockwise, thereby causing movable valve member 85 to pivot clockwise to the position shown in FIG. 9a. The latter movement is, of course, against the force of spring 88 but is assisted by the force of spring 89 with the valve positions, as shown in FIG. 9a. In this position the large groove 118 is in communication with the groove 117 thereby providing a large area bypass to the air pressure which results in a lesser pressure of about 4 lbs. per square inch in cylinder 35. This reduced pressure makes it easier for the workmen to move the work underneath the router tool as already described. As long as an uphill cut is continuing the spiral member 106 will continue to rotate and, thus, will maintain the valve position as described. The friction connection between the end 111 of spiral member 106 and the friction member 112 permits the spiral member to rotate without placing undue stress upon the working parts.

As the cutting tool enters a level cut portion at the upper end of its rising cut, for example, as shown by arrow 75 (FIG. 10), the upward force against the pointer 115 ceases. The springs 88 and 89 then return valve member 85 to the intermediate position thereby bringing small slot 119 into communication with slot 117. The latter provides a bypass of intermediate size to the air pressure and effects a pressure of about 10 lbs. per square inch in cylinder 35.

Upon proceeding to a downhill cut, as shown by arrow 69 (FIG. 10), the spiral member 106 moves downward and by virtue of the end of pointer 102 being in spiral groove 107, and the resistance to rotation of spiral member 106, the valve member 97 is pivoted clockwise and, thus, causes valve member 85 to pivot counterclockwise to the position shown in FIG. 9c. In this position there is no groove in valve member 85 opposite groove 117 in member 82 and, thus, no bypass to the air pressure. Consequently, the higher pressure of 17 lbs. per square inch, for example, exists in cylinder 35, thereby providing the greater force holding the head 24 down and the cutting tool in contact with the workpiece.

So long as the cutting tool continues on a downhill cut, the spiral member 106 will rotate and will maintain the valve member 85 in the position described. In this condition also the resistance to rotation of spiral member 106 is determined by the amount of friction exerted by member 112 against the upper end 111, as described. When the cutter reaches a level portion as shown by arrow 73 (FIG. 10), the downhill movement of member 106 is terminated as is also the tendency to rotate bearing members 97 and 85. Consequently, bearing member 85 (and 97) assumes its median position as shown in FIG. 9b and FIG. 6 thereby providing for an intermediate pressure in cylinder 35.

The relative stiffness of springs 88 and 89 and 103 may be selected, taking into account the friction existing between member 112 and end 111, the friction exerted against the end of pointer 102 by the spiral groove 107, as well as other frictional forces existing so that the desired movements of the valve members take place.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. In router apparatus including a frame, a router head adapted to move up and down on said frame in following the profile of a workpiece, fluid pressure actuated means attached to said frame and said head for assisting said up and down movements, and a source of fluid pressure for said actuating means, the combination comprising: a rack attached to said head for up and down movement therewith, valve means for bypassing a portion of said fluid pressure mounted on said frame, a pinion engaged by said rack, a first pivoting lever frictionally-slidably engaged with said pinion, and a second pivoting lever actuated by said first lever for controlling the valve means in response to said up and down movements.

2. Apparatus according to claim 1, wherein said valve means comprises a cylindrical member having a bore therein through which fluid pressure is supplied, a first bypass passageway through said cylindrical member at an angle to said bore, a pivotable sleeve member surrounding said cylindrical member, and a second bypass passageway through said sleeve member at an angle to its axis and adapted in one of its positions to register with said first bypass passageway and in another of its positions to be out of register with said first bypass passageway.

3. Apparatus according to claim 1, wherein the downward movement of the head causes the valve actuating means to close the bypass valve means, the upward movement of the head causes the valve actuating means to fully open the bypass valve means, and a position of no movement of said head causes the valve actuating means to partially open the bypass valve means.

4. Apparatus according to claim 1, wherein the rack comprises a resistably rotatable member having an axial spiral groove therein, and the valve actuating means comprises a pivotable member having a follower disposed in said spiral groove and a spring-biased to median position member engaged by said pivotable member for controlling the bypass of the valve means.

5. Apparatus according to claim 1, wherein the valve means comprises a cylindrical member having a bore therein through which fluid pressure is supplied, a first bypass passageway through said cylindrical member connected to said bore, a spring-biased to median position pivotable sleeve surrounding said cylindrical member, a second bypass passageway of one size in said sleeve and adapted in one position thereof to register with said first bypass passageway, a third bypass passageway of another size in said sleeve and adapted in another position thereof to register with said first bypass passageway, and said sleeve is adapted in a third position thereof to have no passageway in registry with said first bypass passageway.

6. Apparatus according to claim 5, wherein the second bypass passageway is of maximum size and registers with the first bypass passageway on upward movements of the head, the third bypass passageway is of minimum size and registers with the first bypass passageway in level positions of head, and the third position of said pivotable sleeve occurs on downward movements of the head.

7. Apparatus according to claim 4, including means to achieve resistance to rotation of the spirally grooved member comprising a spring-biased frictional member engaging one end of the spirally grooved member, and the valve means is biased to a median position by a pair of springs, one acting on each side thereof.

References Cited

UNITED STATES PATENTS

| | | | |
|---|---|---|---|
| 1,812,533 | 6/1931 | Hunt. | |
| 2,926,554 | 3/1960 | Weidig | 77—36 |

FRANCIS S. HUSAR, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,601  October 8, 1968

Rudolph F. Onsrud

It is certified that error appears in the above identified patent and that said Letters Patent are hereby corrected as shown below:

Column 6, line 10, "17" should read -- 117 --. Column 8, line 27, after "of", first occurrence, insert -- the --.

Signed and sealed this 17th day of February 1970.

(SEAL)
Attest:

Edward M. Fletcher, Jr.  WILLIAM E. SCHUYLER, JR.
Attesting Officer  Commissioner of Patents